United States Patent [19]

Johansen

[11] Patent Number: 4,842,521

[45] Date of Patent: Jun. 27, 1989

[54] VISUAL AID RULER

[76] Inventor: Kenneth L. Johansen, 1111 W. Cedar Ln., Arlington Heights, Ill. 60005

[21] Appl. No.: 237,960

[22] Filed: Aug. 29, 1988

[51] Int. Cl.⁴ .............................................. G09B 19/00
[52] U.S. Cl. ................................................... 434/187
[58] Field of Search ............... 434/187, 188, 199, 416, 434/421

[56] References Cited

U.S. PATENT DOCUMENTS

| | | | |
|---|---|---|---|
| 832,871 | 10/1906 | Mitchell | 434/199 |
| 1,621,262 | 3/1927 | MacQuarrie | 434/416 |
| 2,191,109 | 2/1940 | Kittredge | 434/153 |
| 2,389,394 | 11/1945 | Thomas | 434/188 |
| 3,406,900 | 10/1968 | Hunt | 434/188 X |
| 3,579,860 | 5/1971 | Strem | 434/187 |

Primary Examiner—William H. Grieb
Attorney, Agent, or Firm—Leydig, Voit & Mayer

[57] ABSTRACT

A visual teaching aid adapted for teaching groups of students in a classroom environment how to read rules and understand dimensional relationships. The teaching aid includes a relatively large sized elongated board adapted for horizontal wall mounting. The board has a scale along the length thereof depicting known units of length proportionally larger than the actual units and a selectively positionable pointer carried in depending fashion from a slide track mounted along the top of the board. A draw cord arrangement, which is operable from either end of the board, is adapted for moving the slide in the track to selectively position the pointer at desired locations along the scale.

19 Claims, 3 Drawing Sheets

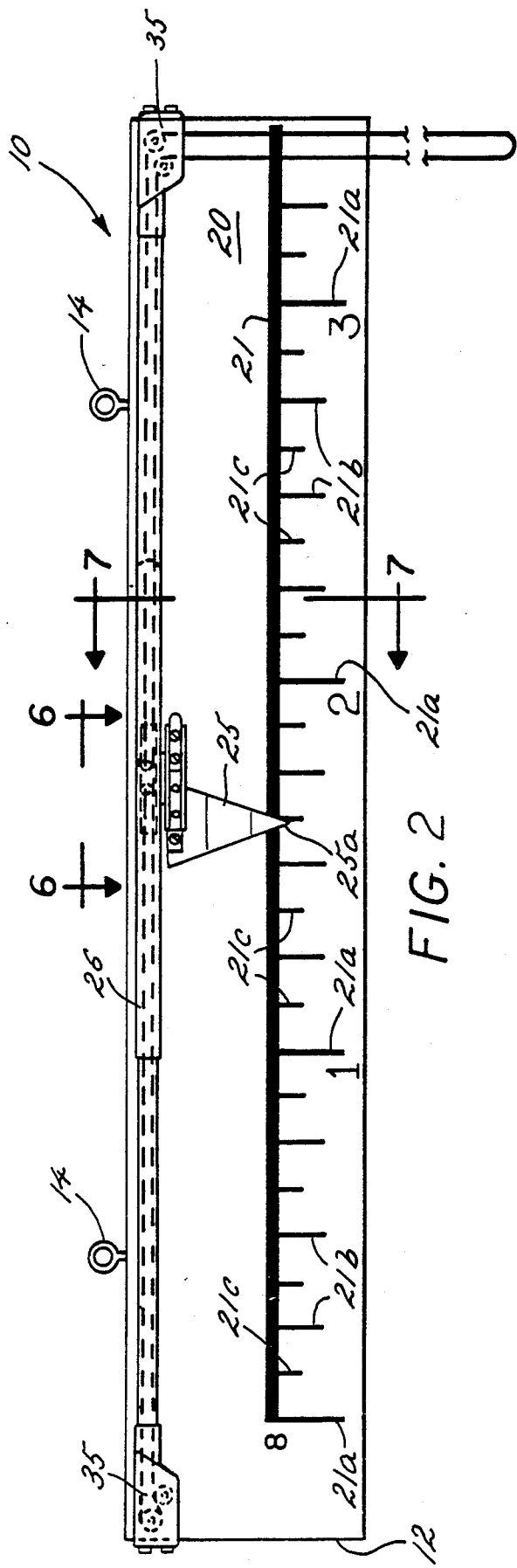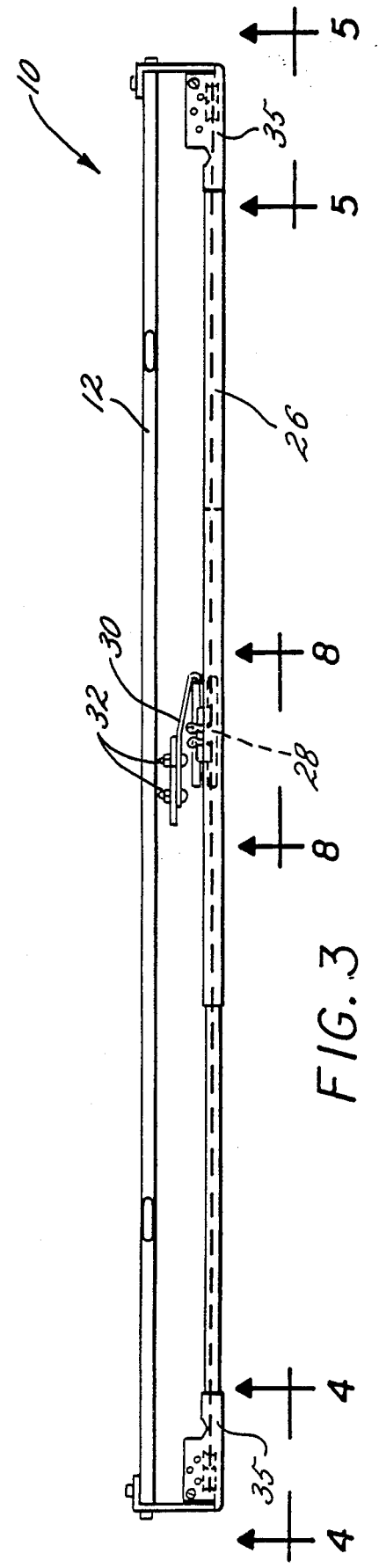
FIG. 2
FIG. 3

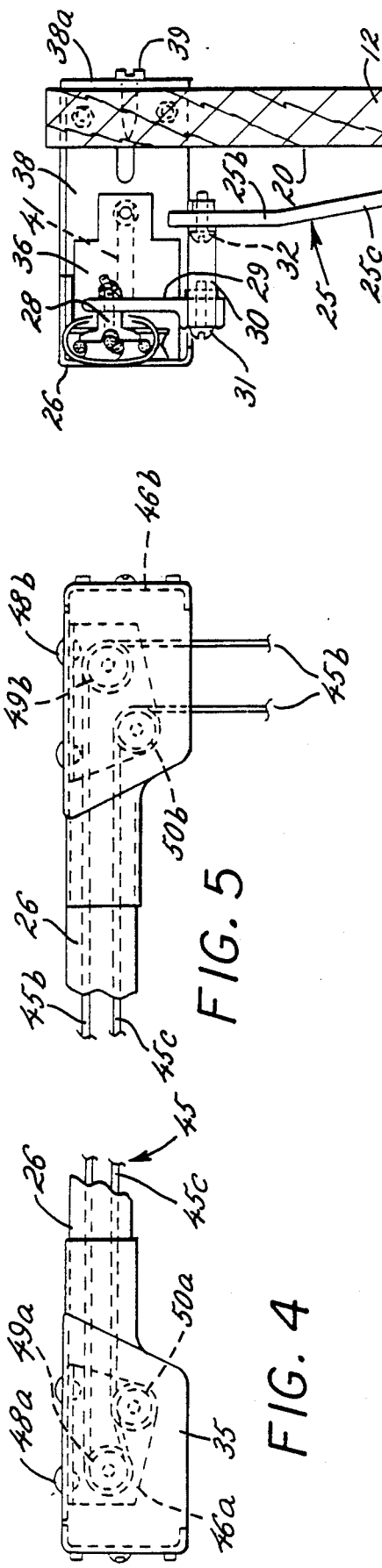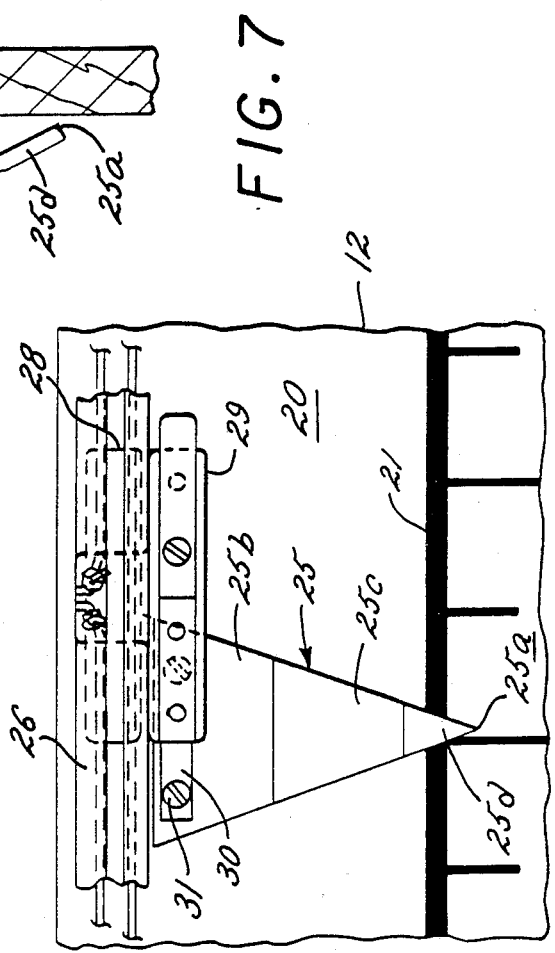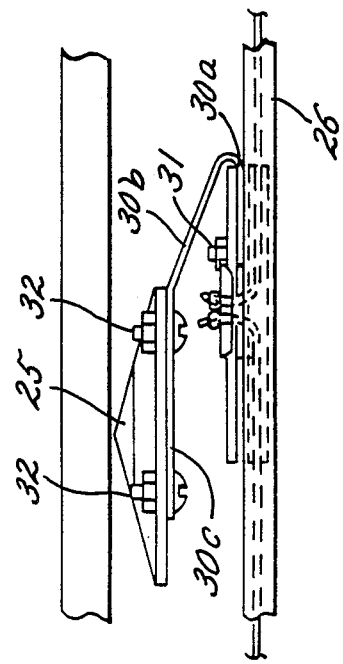

VISUAL AID RULER

DESCRIPTION OF THE INVENTION

The present invention relates generally to teaching aids, and more particularly, to a visual aid for teaching dimensional relationships and the reading of ruler scales.

Teaching dimensional relationships to groups of students, such as in a classroom environment, often has created difficulties, both from the instructor's ability to easily demonstrate visually the information he is attempting to convey and the ability of the student to see and understand such visual information. Rulers generally are small in size and the graduations on the scale, whether in inches or in metric units, are so small that the instructor usually can effectively demonstrate the use of the ruler to only one or two students at a time. Blackboard demonstrations in the use of and reading of rulers are limited. Other visual aids can be difficult to understand or observe, and the observed measurement on the scale can be distorted depending upon the angular perspective of the student relative to the display. The position of the instructor also can impede the view of students.

It is an object of the present invention to provide a visual aid adapted for more easily and effectively teaching students how to read rulers accurately and understand dimensional relationships.

Another object is to provide a visual teaching aid as characterized above that is adapted for use in classrooms for teaching large numbers of students simultaneously.

A further object is to provide a teaching aid of the foregoing type which can be used by an instructor without impeding the view of students in the classroom. A related object is to provide such a visual teaching aid which can be operated by the instructor from either end thereof.

Still another object is to provide a visual teaching aid of the above kind in which measurements can be read accurately by students at various different locations within the classroom.

Yet another object is to provide such a visual teaching aid which has sufficient size to be easily observed by students throughout a classroom, but which is readily portable for use in different classrooms.

Another object is to provide a visual teaching aid of the above kind which is relatively simple and inexpensive in construction and operation.

Other objects and advantages of the invention will become apparent upon reading the following detailed description and upon reference to the drawings, in which:

FIG. 2 is a plane view of the illustrated visual teaching aid;

FIG. 3 is a top view of the illustrated teaching aid;

Figure 1:
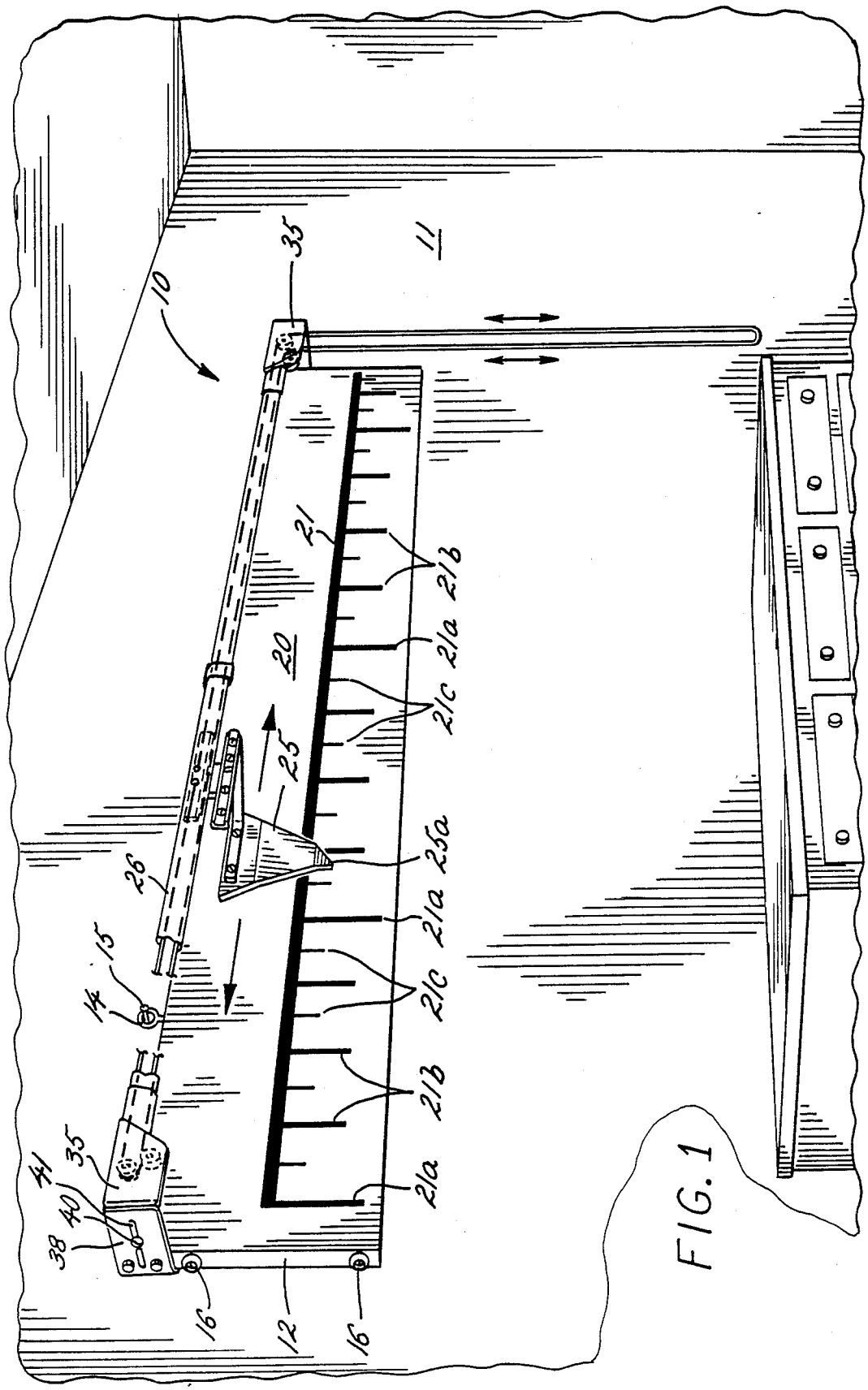
FIG. 1 is a perspective of an illustrative visual teaching aid embodying the present invention shown mounted on the wall of a classroom.

FIGS. 4 and 5 are enlarged front views of opposed ends of illustrated teaching aid, taken in the planes of lines 4—4 and 5—5, respectively, in FIG. 3;

FIG. 6 is an enlarged top view of the moveable pointer of the illustrated teaching aid, taken in the plane of line 6—6 in FIG. 2;

FIG. 7 is an enlarged fragmentary section taken in the plane of line 7—7 in FIG. 2; and FIG. 8 is an enlarged front view of the moveable pointer of the illustrated teaching aid, taken in the plane of line 8—8 in FIG. 3.

While the invention is susceptible of various modifications and alternative constructions, a certain illustrated embodiment thereof has been shown in the drawing and will be described below in detail. It should be understood, however, that there is no intention to limit the invention to the specific form disclosed, but on the contrary, the intention is to cover all modifications, alternative constructions and equivalents falling within the spirit and scope of the invention.

Referring now more particularly to the drawings, there is shown an illustrative visual teaching aid 10 embodying the present invention mounted on the wall 11 of a classroom. The teaching aid 10 includes an elongated board 12 sized so as to be readily observable by a group of students in the room. Preferably, the board has a length on the order of five feet and a depth of about ten inches. Means in the form of hooks 14 are disposed on the top side of the board for permitting its horizontal mounting in the classroom, such as from hooks 15 or the like that may be located along the top of a blackboard. Resilient bumpers 16 (FIG. 1) may be provided on opposed ends of the board to cushion accidental bumping of the ends when being hung or during transport from one classroom to another.

In accordance with the invention, a forwardly directed face of the board has a dimensional scale along its length that is proportionally larger than the units of length depicted, and a pointer is provided that is selectively operable from an end of the board for setting at desired measurements along the scale to facilitate practice in the reading thereof. To this end, in the illustrated embodiment, an inch scale 21 is provided along a lower half of a forwardly directing face 20 of the board, which includes relatively long lines 21a or like indicia depicting inches or other major units of length, shorter length lines 21b depicting one quarter units, and still shorter length lines 21c depicting one eight units of length. The scale 20 in this instance depicts a length of three and one half inches. If the board 12 is five feet in length, each major unit of length, or one inch, would extend approximately one and one half feet, making it easily observable by an entire group of students in the classroom. It will be understood that while the illustrated teaching aid 10 depicts inches, other units of measurement, including metric units could similarly be used.

To facilitate drilling students in reading measurements on the ruler scale, a selectively positionable pointer 25 is mounted for movement along the length of the board 12. For supporting the pointer 25 for such movement, a track 26 is mounted in forwardly spaced relation along the top of the board 12. The track 26 in this case is a tubular member, such as a conventional drapery rod, having a rearwardly opening slot therein which carries a slide 28 for relatively sliding movement. The slide 28 has a depending flange portion 29 (FIGS. 7 and 8) to which the pointer 25 is coupled by means of a reversely angled support member 30. The support member 30 has a first end portion 30a secured to the depending flange portion 29 of the slide 28 by fastening screws 31, a rearwardly extending portion 30b, and a second end portion 30c parallel and rearwardly spaced from the first end portion 30a to which the pointer 25 is secured in depending fashion by fastening screws 32 (FIG. 6).

In keeping with the invention, the pointer has a V-shaped configuration and is supported from the slide in angular relation to the plane of the front face 20 of the board 28 such that a depending tip on apex 25a thereof is in closely adjacent relation to the top of the scale 21. The illustrated pointer 25 has an upper mounting portion 25b depending in parallel relation to the plane of the forwardly directed face 20 of the board 12, a first rearwardly inclined portion 25c, and a lower most tip portion 25d disposed at an angle of about 30° to the plane of the front face of the board (FIGS. 7 and 8). Since the lower most tip 25a of the pointer is disposed in close relation to the front face of the board, it will be appreciated that relatively accurate readings can be made of a measurement by students even though they are at different locations within the classroom, and thus, have different perspectives of the pointer and board. The pointer 25 preferably is made of a bright colored plastic material, such as orange, and is sized so as to be easily observable. The pointer 25 in this instance extends downwardly about one half the depth of the board 12 with the tip 25a thereof being moveable along the top edge of the scale 21, which occupies the lower half of the board. The pointer 25 and scale 21, therefore, both can be observed without the pointer impeding viewing of the scale.

To insure that the depending pointer tip is located in closely spaced, or alternatively in sliding contact with the forwardly directed face 20 of the board 12, the track 26 is mounted for selective positioning relative to the forward board face 20. For this purpose, opposed ends of the track 26 are supported in front mounting brackets 35 which in turn are secured to respective adjustable slide plates 36 (FIGS. 4, 5 and 7). The slide plate 36 is adjustably mountable on mounting brackets 38 secured to respective ends of the board 12, the mounting brackets 38 have respective inwardly turned flanges 38a each of which is secured to a rear side of the board 12 by screws 39 (FIG. 7). To permit relative positioning of the slide plate 36, the front mounting brackets 35, and the track 28 relative to the rear mounting brackets 38, a fastening screw 40 for each slide plate 36 is mounted within an elongated slot 41 and in the respective rear mounting bracket 38 (FIGS. 1 and 7).

In order to move the slide 28 and pointer 25 relative to the track 26 and board 12, a draw cord 45 is provided which has its ends secured to the slide 28 so as to form an endless loop. A roller assembly is mounted at each end of the track 26, each comprising a respective plate 46a, 46b which is secured to the top of a front support bracket 35 by screws 48a, 46b and carries a pair of relatively rotatable rollers 49a, 49b, and 50a, 50b (FIG. 5). The draw cord 45 has a first upper section 45a connected to the slide 28 and trained over an upper roller 49b of the roller assembly on the right hand side of the board, as viewed in FIGS. 1, 4 and 5, a depending loop section 45b that extends downwardly from the upper roller 49b on the right hand side and back over the lower roller 50b of that roller assembly, a lower horizontal section 45c trained between the lower rollers 50a, 50b of the roller assemblies, and a second upper section 45d extending over the upper roller 49a and connecting to the slide 28. It will be seen that by pulling the loop section 45b of the draw cord 45, the slide 28 and pointer 45 may be moved along the track 26 to selectively position the pointer 25 at desired locations. Since an instructor may stand adjacent the end of the board while working the draw cord, he will not obstruct the students view of the board. Moreover, by simply drawing down a section of the cord 45 between the rollers 49a, 50a of the roller assembly at the opposite end of the board, the instructor may operate the pointer from that end of the board if desired.

From the foregoing, it will be seen that the teaching aid 10 of the present invention can be operated by an instructor from either end thereof without impeding the view of students by simply pulling the draw cord 45. Through repeated practice and drills, it has been found that students can quickly learn dimensional relationships and how to read ruler scales. Because of the size and arrangement of the scale and pointer, the teaching aid can be easily observed by students throughout the classroom. Moreover, the teaching aid is relatively simple and economical in construction and operation, and can be readily handled and moved for use in different classrooms.

I claim as my invention:

1. A visual teaching aid comprising
   an elongated board adapted for horizontal mounting with a face thereof forwardly directed,
   said board having a scale along the length of said forwardly directed face depicting known units of length proportionally larger than the actual units,
   a track mounted in parallel relation to said board and scale,
   a slide mounted for relative movement in said track,
   a pointer carried by said slide with an end thereof disposed in closely adjacent relation to said scale, and
   means operable from an end of said board for moving said slide in said track to selectively position said pointer at desired locations along said scale.

2. The teaching aid of claim 1 in which said slide moving and pointer positioning means is operable from either end of said board.

3. The teaching aid of claim 1 in which said track is supported in forwardly spaced relation to said forwardly directed board face, and said pointer is carried in depending position from said slide.

4. The teaching aid of claim 3 in which said pointer depends from said slide in angular relation to said forwardly directed board face with a lower end thereof is in closely adjacent relation to said face.

5. The teaching aid of claim 4 in which said lower end of said pointer has a downwardly directed V-shape.

6. The visual aid of claim 1 in which said scale has indicia of major units of length and indicia of divisions of said major units of length.

7. The visual aid of claim 6 in which said indicia of major units of length are first lines of uniform length, and said indicia of divisions of said major units of length are lines of relatively shorter length than said first lines.

8. The visual aid of claim 1 including track mounting means for selectively positioning said track and the slide and pointer carried thereby relative to said forwardly directed face.

9. The visual aid of claim 1 including a generally U-shaped pointer mounting member having a first leg fixed to said slide and a second leg spaced rearwardly of said first leg, said pointer being secured in depending fashion from said second leg.

10. The visual aid of claim 1 in which said slide moving and pointer positioning means includes a draw cord affixed to said slide, and roller means at opposed ends of said board for supporting said draw cord for relative movement whereby pulling on said cord moves said slide along said track.

11. The visual aid of claim 10 in which said draw cord may be pulled from either end of said board to move said slide.

12. The visual aid of claim 10 including end brackets for supporting said track from opposed ends thereof, said roller means being mounted on said end brackets.

13. The visual aid of claim 1 in which said pointer is moveable along an upper half of said forward board face, and said scale is on a lower half of said forward board face.

14. The visual aid of claim 13 in which said pointer depends about one half of the depth of said forward board face, and said scale has indicia of major units of length which extend about one half the depth of said forward board face.

15. The teaching aid of claim 1 in which said track is supported in forwardly spaced relation to said forwardly directed board face, said pointer being carried in depending position from said slide and having a V-shape with the apex of the V being downwardly directed in close relations to said forward board face.

16. The visual aid of claim 15 in which said slide moving and pointer positioning means includes a draw cord affixed to said slide, and roller means at opposed ends of said board for supporting said draw cord for relative movement whereby pulling on said cord moves said slide along said track.

17. The visual aid of claim 16 in which said pointer is moveable along an upper half of said forward board face, and said scale is on a lower half of said forward board face.

18. The visual aid of claim 17 in which said pointer depends about one half of the depth of said forward board face, and said scale has indicia of major units of length which extend about one half the depth of said forward board face.

19. The teaching aid of claim 1 including hanger means for supporting said board for horizontal mounting.

* * * * *